(12) United States Patent
Sweeney et al.

(10) Patent No.: US 7,547,408 B1
(45) Date of Patent: Jun. 16, 2009

(54) PROCESS FOR REDUCING NON-UNIFORMITIES IN THE DENSITY OF SINTERED MATERIALS

(75) Inventors: Sean M. Sweeney, Schenectady, NY (US); Timothy Yosenick, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 405 days.

(21) Appl. No.: 11/460,883

(22) Filed: Jul. 28, 2006

(51) Int. Cl.
    *B28B 1/00* (2006.01)
(52) U.S. Cl. .................. 264/658; 264/654; 264/603
(58) Field of Classification Search .......... 264/603, 264/654, 658
    See application file for complete search history.

(56) References Cited

U.S. PATENT DOCUMENTS

| | | | | |
|---|---|---|---|---|
| 2,834,651 A | * | 5/1958 | Gray | 423/291 |
| 4,118,450 A | * | 10/1978 | Nakamura et al. | 264/43 |
| 5,942,099 A | * | 8/1999 | Nitschke et al. | 205/617 |
| 6,309,995 B1 | * | 10/2001 | Maher et al. | 501/138 |

OTHER PUBLICATIONS

Ness, Eric A. and Rafaniello, William, "Origin of Density Gradients in Sintered β-Silicon Carbide Parts," Journal of the American Ceramic Society, vol. 77, No. 11, 2879-84 (1994).
Sean M. Sweeney, "Permeability, Drying, and Sintering of Pressure Filtered Ceramic Nanopowders," Chapter 6, "Sintering Study," pp. 135-195, Appendices G and H, pp. 284-295, Ph.D. Thesis, Graduate School, Pennsylvania State University, Dept. of Materials Science and Engineering, (May 2005).

* cited by examiner

*Primary Examiner*—Steven P Griffin
*Assistant Examiner*—Russell J Kemmerle, III
(74) *Attorney, Agent, or Firm*—Paul J. DiConza

(57) ABSTRACT

There is disclosed a pre-sintering process for reducing non-uniformities in the density of a sintered material comprising (a) providing a mixture of (i) a first sinterable material containing a contaminant the presence of which during sintering of the first sinterable material results in a higher vapor pressure than would occur during sintering of pure first sinterable material and (ii) a second material having a higher affinity for the contaminant than does the first sinterable material; and (b) heating the mixture at a temperature and for a time sufficient to allow the second material to at least partly mitigate the propensity of the contaminant to raise the vapor pressure during the sintering of the first sinterable material. Other embodiments are also disclosed.

33 Claims, No Drawings

PROCESS FOR REDUCING NON-UNIFORMITIES IN THE DENSITY OF SINTERED MATERIALS

STATEMENT OF U.S. GOVERNMENT INTEREST

The invention described or claimed herein was made with U.S. Government support under Government Contract No. W56 HZV-05-C-0517, awarded by the U.S. Army Research TACOM LCMC-Warren. The Government has certain rights in this invention.

FIELD OF THE INVENTION

The present invention relates to a process for reducing non-uniformities in the density of sintered materials.

BACKGROUND OF THE INVENTION

In both oxide and non-oxide metal and ceramic materials, impurities such as halogens, especially chlorine and fluorine, can evolve as a gas during sintering of the materials, as can oxygen impurities in non-oxide metals and ceramic materials. Such evolved gases may react with the metal or ceramic materials to form one or more secondary gaseous species containing one or more of the constituent elements of the metal or ceramic material, thus effectively raising the vapor pressure of the metal or ceramic material, where "vapor pressure" refers to the total partial pressure of all gaseous species containing cation(s) of the sintering material. This can in turn lead to evaporation/condensation coarsening of the microstructure. Uneven evaporation/condensation coarsening of the microstructure during sintering can cause density gradients to form in the material, e.g. to a more dense exterior than interior, and limit the densities attainable. Ness & Rafaniello, J. Am. Cer. Soc., 77:2879-2874 (1994); portions of Sweeney, "Permeability, Drying, and Sintering of Pressure Filtered Ceramic Nanopowders", Ph.D. Thesis, The Pennsylvania State University, 2005; and U.S. Pat. No. 2,834,651, the contents of all of which are incorporated herein by reference, are believed to represent relevant prior art.

BRIEF DESCRIPTION OF EMBODIMENTS OF THE INVENTION

There is provided, in accordance with an embodiment of the invention, a pre-sintering process for reducing non-uniformities in the density of a sintered material, the pre-sintering process comprising: (a) providing a mixture of (i) a first sinterable material containing a contaminant the presence of which during sintering of the first sinterable material results in a higher vapor pressure than would occur during sintering of pure first sinterable material and (ii) a second material having a higher affinity for the contaminant than does the first sinterable material; and (b) heating the mixture at a temperature and for a time sufficient to allow the second material to at least partly mitigate the propensity of the contaminant to raise the vapor pressure during the sintering of the first sinterable material.

There is also provided, in accordance with an embodiment of the invention, a process for improving the uniformity of density in a sintered material, the process comprising: (a) providing a mixture of (i) a first sinterable material containing a contaminant the presence of which results in non-uniform density in the first sinterable material during sintering of the first sinterable material and (ii) a second material having a higher affinity for the contaminant than does the first sinterable material; and (b) heating the mixture at a first temperature below the sintering temperature of the first sinterable material and for a first time sufficient to allow the second material to at least partly mitigate the propensity of the presence of the contaminant to result in non-uniform density during the sintering of the first sinterable material.

DEFINITIONS

In the context of the present application, the following definitions apply:

"Sintering" refers to the agglomeration of metal, glass or ceramic powders into a coherent mass at a temperature below the melting point. Sintering occurs in both powder metallurgy and ceramic firing.

"Sinterable material" refers to a material which can undergo sintering.

The term "oxide", when used with respect to a sinterable material, refers to a mineral in which metallic atoms are bonded to oxygen atoms. Examples of sinterable oxide materials include but are not limited to $K_2O$, $Na_2O$, $Li_2O$, $ZnO$, $BeO$, $Cu_2O$, $Fe_2O_3$, $SiO_2$, $UO_2$, $Bi_2O_3$, $CoO$, $Mn_3O_4$, $TiO_2$, $MgO$, $ZrO_2$, $BaO$, $ThO_2$, $Ta_2O_5$, $Al_2O_3$, $Nb_2O_5$, $CaO$, $NiO$, $SrO$, $Cr_2O_3$, $V_2O_5$, $B_2O_3$, $HfO_2$, $Y_2O_3$, $Mn_3O_4$, $BaTiO_3$, $MgAl_2O_4$, $Y_3Al_5O_{12}$, and $Fe_3O_4$.

The term "non-oxide", when used with respect to a sinterable material, refers to a mineral which in principle does not contain oxygen atoms, or which forms an oxide only on its exposed surface. Examples of sinterable non-oxide materials include but are not limited to $SiC$, $TiC$, $ZrC$, $BN$, $AlN$, $Si_3N_4$, $TiB_2$, $ZrB_2$, $HfB_2$, $HfC$, $TiN$ and $B_4C$.

A "contaminant" in a sinterable material refers to any material which is contained in or mixed with the sinterable material, and the presence of which during sintering contributes to non-uniform density in the sintered product. As will be explained by way of example below, a common mechanism for a contaminant to contribute to such non-uniform density is by reacting with one of the elements in the sinterable material so as to raise the vapor pressure during sintering relative to what the vapor pressure during sintering would be in the absence of the contaminant (i.e. if one were sintering a pure sinterable material). Common contaminants include chlorine, fluorine, and, in the case of non-oxide sinterable materials, oxygen. In the context of this patent application, reference to chlorine or fluorine as a contaminant will be understood to include not only $Cl_2$ and $F_2$ but other Cl- and F-containing materials from which $Cl_2$, HCl, $F_2$ and HF respectively can be generated. Similarly, reference to oxygen as a contaminant will be understood to include oxygen-containing materials from which $O_2$, CO or $CO_2$ can be generated.

"Coarsening" refers to grain and/or pore growth in a material undergoing sintering, but without concurrent densification of the material.

The term "prevent", as used in the present description and claims, is not meant to be an absolute term, and encompasses reducing, decreasing or preventing the occurrence of a phenomenon or the amelioration of the effects of a phenomenon. Thus, for example, the expression "prevent a contaminant from forming a gas" should be understood to mean not only eliminating the formation of a gas by the contaminant, but reducing or decreasing the formation of a gas by the contaminant.

DETAILED DESCRIPTION OF EMBODIMENTS OF THE INVENTION

As stated, in accordance with an embodiment of the invention there is provided a pre-sintering process for reducing non-uniformities in the density of a sintered material, the pre-sintering process comprising: (a) providing a mixture of (i) a first sinterable material containing a contaminant the presence of which during sintering of the first sinterable material results in a higher vapor pressure than would occur during sintering of pure first sinterable material and (ii) a second material having a higher affinity for the contaminant than does the first sinterable material; and (b) heating the mixture at a temperature and for a time sufficient to allow the second material to at least partly mitigate the propensity of the contaminant to raise the vapor pressure during the sintering of the first sinterable material.

In accordance with some embodiments of the invention, the second material reacts with the contaminant to prevent the contaminant from forming a gas at the sintering temperature of the sinterable material. In accordance with other embodiments of the invention, the second material reacts with the contaminant to form a fluid at a temperature below the sintering temperature of the first sinterable material, the fluid being sufficiently volatile to be eliminated from the first sinterable material before the first sinterable material reaches the sintering temperature.

In some embodiments of the invention, the sinterable material when sintered forms a ceramic.

In some embodiments of the invention, the sinterable material is anon-oxide. In some embodiments, the non-oxide is chosen from SiC, TiC, ZrC, BN, AlN, $Si_3N_4$, $TiB_2$, $ZrB_2$, $HfB_2$, HfC, TiN and $B_4C$. In some embodiments, when the sinterable material is a non-oxide, the contaminant is oxygen.

In some embodiments of the invention, the contaminant is chlorine. In some embodiments, the contaminant is fluorine. In some embodiments of the invention, the first sinterable material is an oxide. In some embodiments, the first sinterable material is chosen from $K_2O$, $Na_2O$, $Li_2O$, ZnO, BeO, $Cu_2O$, $Fe_2O_3$, $SiO_2$, $UO_2$, $Bi_2O_3$, CoO, $Mn_3O_4$, $TiO_2$, MgO, $ZrO_2$, BaO, $ThO_2$, $Ta_2O_5$, $Al_2O_3$, $Nb_2O_5$, CaO, NiO, SrO, $Cr_2O_3$, $V_2O_5$, $B_2O_3$, $Y_2O_3$, $Mn_3O_4$, $HfO_2$, $BaTiO_3$, $MgAl_2O_4$, $Y_3Al_5O_{12}$, $Fe_3O_4$, and mixtures thereof.

In some embodiments of the invention, the contaminant is chlorine, and the first sinterable material is chosen from (in order of generally decreasing affinity of the cation for forming a gaseous species with chlorine) $K_2O$, $Na_2O$, $Li_2O$, ZnO, BeO, $Cu_2O$, $Fe_2O_3$, $SiO_2$, $UO_2$, $Bi_2O_3$, CoO, $Mn_3O_4$, $TiO_2$, MgO, $ZrO_2$, BaO, $ThO_2$, $Ta_2O_5$, $Al_2O_3$, $Nb_2O_5$, CaO, NiO, SrO, $Cr_2O_3$, $V_2O_5$, $B_2O_3$, $HfO_2$, $Y_2O_3$ and mixtures thereof. In other embodiments of the invention, the contaminant is fluorine, and the first sinterable material is chosen from (in order of generally decreasing affinity of the cation for forming a gaseous species with fluorine) $K_2O$, $Na_2O$, $B_2O_3$, $Al_2O_3$, $Li_2O$, BeO, $Cu_2O$, $Fe_2O_3$, $SiO_2$, $UO_2$, $Bi_2O_3$, CoO, NiO, $TiO_2$, MgO, ZrO2, BaO, $ThO_2$, $Ta_2O_5$, $Nb_2O_5$, CaO, SrO, $Cr_2O_3$, $V_2O_5$, $Y_2O_3$ and mixtures thereof.

In accordance with some embodiments of the invention, the second material is an alkali metal or an alkali metal salt. In some embodiments of the invention, the second material is a lithium material. In some embodiments of the invention, the first sinterable material is an oxide and the lithium material is chosen from lithium metal, lithium salts or other lithium-containing compounds in which the non-lithium component (anion or other non-lithium component) will be eliminated from the salt or lithium-containing compound at a temperature below 1000 degrees Celsius. In some embodiments of the invention, the first sinterable material is an oxide and the lithium material is chosen from lithium oxide, lithium peroxide, lithium oxalate, lithium carbonate, lithium carbide, lithium nitride, lithium tert-butoxide, lithium tartrate, and lithium stearate, or a combination thereof. In other embodiments of the invention, the first material is a non-oxide and the lithium material is provided in the form of lithium metal. In other embodiments of the invention, the first sinterable material is a boride and the lithium material is provided in the form of lithium boride. In other embodiments of the invention, the first sinterable material is a carbide and the lithium material is provided in the form of lithium carbide. In other embodiments of the invention, the first sinterable material is a nitride and the lithium material is provided in the form of lithium nitride. In accordance with some embodiments of the invention, the molar ratio of alkali metal or alkali metal salt to contaminant is from about 1:1 to about 1.2:1. In some embodiments of the invention, the amount of alkali metal or alkali metal salt relative to the contaminant is from 95% of stoichiometric equivalent to 1000% stoichiometric excess. In some embodiments of the invention, the amount of alkali metal or alkali metal salt relative to the contaminant is from 95% of stoichiometric equivalent to 100% stoichiometric excess. In some embodiments of the invention, the amount of alkali metal or alkali metal salt relative to the contaminant is from a stoichiometric equivalent to 20% stoichiometric excess. In some embodiments of the invention, the amount of alkali metal or alkali metal salt relative to said contaminant is from a 20% stoichiometric excess to a 1000% stoichiometric excess. In some embodiments of the invention, the amount of alkali metal or alkali metal salt relative to said contaminant is from a 20% stoichiometric excess to a 100% stoichiometric excess.

In accordance with some embodiments of the invention, the second material is selected from the group consisting of alkaline earth metals and salts thereof.

In accordance with some embodiments of the invention, the temperature at which the mixture is heated is below the sintering temperature of the sinterable material. In some embodiments of the invention, the temperature is from 400-1000 degrees Celsius. In some embodiments of the invention, the temperature is from 650-1100 degrees Celsius. In some embodiments of the invention, the temperature is from 650-800 degrees Celsius.

As stated, there is also provided, in accordance with an embodiment of the invention, a process for improving the uniformity of density in a sintered material, the process comprising: (a) providing a mixture of (i) a first sinterable material containing a contaminant the presence of which results in non-uniform density in the first sinterable material during sintering of the first sinterable material and (ii) a second material having a higher affinity for the contaminant than does the first sinterable material; and (b) heating the mixture at a first temperature below the sintering temperature of the first sinterable material and for a first time sufficient to allow the second material to at least partly mitigate the propensity of the presence of the contaminant to result in non-uniform density during the sintering of the first sinterable material. In accordance with a variation of this embodiment of the invention, the process comprises further heating the mixture for a second time and at a second temperature higher than the first temperature sufficient to sinter the first sinterable material. In some embodiments of the invention, the mixture is not cooled between steps (b) and (c). In other embodiments of the invention, the mixture is allowed to cool between steps (b) and (c).

To help illustrate some embodiments of the invention, an example will now be discussed, in which the sinterable material is zirconia and the contaminant is chlorine. However, it will readily be appreciated by those skilled in the art that this example is merely illustrative, and that the invention is not limited to the embodiments illustrated by this example.

Zirconia and chlorine (as HCl or $Cl_2$) can react in the following manner:

$$ZrO_2(s)+4HCl(g) \rightleftharpoons ZrCl_4(g)+2H_2O(g)$$

$$ZrO_2(s)+2Cl_2(g) \rightleftharpoons ZrCl_4(g)+O_2(g)$$

When these reactions proceed to the right, they effectively constitute evaporation, and when they proceed to the left they effectively constitute condensation. The higher the partial pressures of HCl and $Cl_2$, the higher the partial pressure of $ZrCl_4$. This results in both coarsening of the zirconia during sintering and greater density gradients. In particular, in this example, $ZrCl_4$ gas will escape more readily from the sample surface than from the interior. As a result, lower HCl partial pressure, and thus lower $ZrCl_4$ partial pressure will exist at the sample surface, leading to a gradient in coarsening and thereby producing a material with a more dense exterior surface than interior surface, i.e. a density gradient.

To determine the maximum tolerable chlorine level in the initial powder to be sintered, criteria known to one skilled in the art can be used. The rate of HCl or $Cl_2$ evolution may be transformed to a partial pressure distribution in the sample. The measured rate of HCl or $Cl_2$ evolution (as determined by thermo-gravimetric analysis (TGA) and/or thermal desorption mass spectrometry) may be used to calculate a partial pressure distribution of the HCl or $Cl_2$ gas in the sample, as well as partial pressure distribution of any gas from the sintering atmosphere (such as oxygen when sintering in air). Thermodynamic calculations may then be performed to determine the vapor pressure of the sintering species under this mixture of gas partial pressure distributions. The vapor pressure can in turn be used to calculate rates of neck growth due to evaporation/condensation coarsening. Based upon these calculations, the HCl or $Cl_2$ gas evolution rate should be maintained below the critical value at which the rate of neck growth due to evaporation/condensation coarsening exceeds the rate of neck growth due to densification in the center of the sample.

In this example, in accordance with embodiments of the present invention, in order to suppress the formation of $ZrCl_4$ gas and thereby decrease or eliminate the density gradient, an appropriate amount of a second material having a higher affinity for chlorine than does Zr is added to the zirconium oxide prior to sintering. In some embodiments, particles of the second material may be mixed with particles of $ZrO_2$, whereas in other embodiments the $ZrO_2$ may be chemically doped with the second material, i.e. the $ZrO_2$ may be formed in the presence of the second material so that particles of $ZrO_2$ contain the second material as well. In this example, where the $ZrO_2$ has a chlorine-containing contaminant, lithium may be added, for example by mixing particles of lithium oxide, lithium peroxide, lithium oxalate, lithium carbonate, lithium carbide, lithium nitride, lithium tert-butoxide, lithium tartrate, or lithium stearate with $ZrO_2$. For example, one may create a suspension of $ZrO_2$ in water, dissolve the lithium compound in the water, and then dry the mixture, so that the lithium compound mixed with zirconia particles remains. A lithium solution could also be added to a powder compact or bisque-fired (partially sintered) compact, allowing the lithium solution to penetrate the pores of the compact, and then drying the compact, or lithium metal powder could be melt-infiltrated into the compact. Alternatively, a gaseous lithium compound may be brought into contact with the sinterable material during sintering, the gaseous compound being either introduced from the outside or generated in situ. Lithium metal or a lithium compound may also be dry mixed with a powder of the sinterable material and incorporated into the powder by calcination, prior to powder consolidation into a powder compact. The amount of lithium (or, more generally, second material) should be enough to stoichometrically compensate for all the chlorine (or more generally, contaminant), although it will be appreciated that using less than a stoichiometric equivalent may still be beneficial. In some embodiments of the invention, a stoichiometric equivalent or slight stoichiometric excess, e.g. 1-1.2 equivalents, will be sufficient. In other embodiments of the invention, a larger stoichiometric excess, e.g. 1.2-2.0 equivalents or even up to 11 equivalents, may be used.

In an analogous manner, the presence of a chlorine contaminant in MgO can result in the formation of density gradients during sintering. In accordance with embodiments of the invention, addition of a sodium-containing material to the MgO prior to sintering can ameliorate the effects of the contaminant and decrease or eliminate the density gradient. In the case of magnesium aluminum oxide having a residual chlorine-containing impurity, the addition of lithium nitrate prior to vacuum sintering reduced the degree of density gradient in comparison to a sample containing the same concentration of chlorine contaminant, as indicated by the higher density of the sample made with lithium nitrate addition.

In addition to zirconia, other examples of sinterable materials that may be affected by contaminants are SiC, TiC, ZrC, BN, AlN, $Si_3N_4$, $TiB_2$, $ZrB_2$, $HfB_2$, HfC, TiN and $B_4C$ (non-oxide materials), $K_2O$, $Na_2O$, $Li_2O$, ZnO, BeO, $Cu_2O$, $Fe_2O_3$, $SiO_2$, $UO_2$, $Bi_2O_3$, CoO, $Mn_3O_4$, $TiO_2$, MgO, $ZrO_2$, BaO, $ThO_2$, $Ta_2O_5$, $Al_2O_3$, $Nb_2O_5$, CaO, NiO, SrO, $Cr_2O_3$, $V_2O_5$, $B_2O_3$, $Y_2O_3$, $Mn_3O_4$, $HfO_2$, $BaTiO_3$, $MgAl_2O_4$, $Y_3Al_5O_{12}$, and $Fe_3O_4$ (oxide materials). Chlorine and fluorine are typical contaminants in both types of materials, and oxygen may be a contaminant in oxide materials.

In general, the greater the affinity of the second material for the contaminant, the better the results that will be obtained, provided that the presence of the second material does not result in poorer properties for the sintered material, such as reduced optical transmission or decreased mechanical strength, than if the second material were not present. An appropriate sintering schedule will vary depending on the material being sintered, the nature of the contaminant, and the second material being used to reduce non-uniform densities in the sintered product. One way to determine a sintering schedule is to vary the rates at which similar samples are heated, the temperatures at which similar samples are held and the durations for which similar samples are held at those temperatures, and to compare the density, density gradient, optical transparency (if applicable) or other density-dependent properties to ascertain the optimal sintering schedule and amount of second material to be used. Alternatively, one may perform dilatometry experiments to determine a master sintering curve (see Su & Johnson, J. Am. Cer. Soc., 79[12], 3211-3217 (1996), the contents of which are incorporated herein by reference) and perform thermal desorption mass spectrometry and/or thermogravimetric analysis (TGA) experiments to determine a master decomposition curve (see DiAntonia et al., J. Am. Cer. Soc., 88[10], 2722-2728 (2005), the contents of which are incorporated herein by reference).

This enables prediction of both the sintering rate and evolution rate of HCl or other gas under any given sintering conditions. A spreadsheet computer program may thus be used to calculate the sintering rate and gas evolution rate for a variety of samples and conditions. From the gas evolution rate, the partial pressure distribution in the sample may be calculated. From this information, it may be calculated when densification will predominate over coarsening at all points in the sample during sintering, and when use of a second material as described above is advised.

Experimental Example 1

Dilatometry bars were uniaxially pressed in a hardened steel die to 43 MPa, followed by cold isostatic pressing in a latex bag to 275 MPa. The green densities of the bars as measured by geometry were 54% of theoretical, and the dimensions of the bars after the dilatometry test were approximately 5.2 mm×5.8 mm×14.6 mm. The dilatometer was operated under vacuum at 5° C./min to 1600° C., with no hold at temperature. One sample (Sample 1) was made from a magnesium aluminum oxide ($MgAl_2O_4$) powder containing 9 ppm chlorine by weight and <1 ppm lithium by weight as measured by glow discharge mass spectrometry (GDMS). A second sample (Sample 2) was made from the same starting powder, but with 18 ppm by weight of lithium added in the form of lithium hydroxide (corresponding to 10 times the amount necessary to form a stoichiometric LiCl compound in the presence of 9 ppm chlorine). In Sample 1, with no added source of lithium, a density of 90% of theoretical was obtained at 1334° C., while in Sample 2, with added lithium, this same density was obtained at 1306° C. In Sample 1, a density of 95% of theoretical was obtained at 1386° C. whereas in Sample 2 this density was obtained at 1370° C. At a temperature of 1350° C., a density of 93.8% of theoretical was obtained in Sample 2, while in Sample 1 a density of 92.0% of theoretical was obtained at this temperature. (The densities reported from dilatometry experiments were calculated assuming isotropic shrinkage based upon the measured shrinkage and the final density measured by the Archimedes method.) Disk-shaped samples dry pressed from the same powders were sintered under an oxygen atmosphere and resulted in 97.2% of theoretical density for the sample containing added lithium versus 95.7% of theoretical density for the sample without added lithium. (These last two densities were measured by the Archimedes method with water as an immersion medium.) An increased overall density is taken as being indicative of a reduced or non-existent density gradient relative to the sample without added lithium.

Experimental Example 2

A sample (Sample 3) of a magnesium aluminum oxide ($MgAl_2O_4$) powder containing 260 ppm chlorine and <1 ppm lithium was made by uniaxially pressing to 100 MPa, followed by cold isostatical pressing to 275 MPa. As-pressed sample dimensions were 12.3 mm diameter and 1.6 mm thickness. Green density, as measured by geometry, was 52%. A second sample (Sample 4) of the same powder was identically processed, but with lithium nitrate added so as to leave behind 1.68 times as many moles of lithium after nitrate decomposition as moles of chlorine present. After sintering to 1283° C./3 h under flowing oxygen, 96.2% of theoretical density was obtained in Sample 3, whereas in Sample 4 98.2% of theoretical density was obtained.

The written description uses examples to disclose the invention, including the best mode, and also to enable any person skilled in the art to make and use the invention. The patentable scope of the invention is defined by the claims, and many include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A pre-sintering process for reducing non-uniformities in the density of a sintered material, the pre-sintering process comprising:
    (a) providing a mixture of
    (i) a first sinterable material containing a contaminant the presence of which during sintering of said first sinterable material results in a higher vapor pressure than would occur during sintering of pure said first sinterable material and
    (ii) a second material having a higher affinity for said contaminant than does said first sinterable material, wherein the amount of the second material relative to the contaminant is from 95% of stoichiometric equivalent to 1000% stoichiometric excess; and
    (b) heating said mixture at a temperature and for a time sufficient to allow said second material to at least partly mitigate the propensity of said contaminant to raise the vapor pressure during said sintering of said first sinterable material.

2. A process according to claim 1, wherein said second material reacts with said contaminant to prevent said contaminant from forming a gas at the sintering temperature of said sinterable material.

3. A process according to claim 2, wherein when said second material reacts with said contaminant it forms a fluid at a temperature below the sintering temperature of said first sinterable material, said fluid being sufficiently volatile to be eliminated from said sinterable material before said first sinterable material reaches said sintering temperature.

4. A process according to claim 1, wherein said sinterable material when sintered forms a ceramic.

5. A process according to claim 1, wherein said sinterable material is a non-oxide.

6. A process according to claim 5, wherein said sinterable material is chosen from SiC, TiC, ZrC, BN, AlN, $Si_3N_4$, $TiB_2$, $ZrB_2$, $HfB_2$, HfC, TiN and $B_4C$ and mixtures thereof.

7. A process according to claim 5 or 6, wherein said contaminant is oxygen.

8. A process according to any of claims 5-6, wherein said second material is selected from the group consisting of alkali metals and alkaline earth metals and salts thereof.

9. A process according to claim 8, wherein said second material is an alkaline earth metal or a salt thereof.

10. A process according to any of claims 1-6, wherein said contaminant is chlorine or fluorine.

11. A process according to any of claims 1-4, wherein said first sinterable material is an oxide.

12. A process according to claim 11, wherein said first sinterable material is chosen from $K_2O$, $Na_2O$, $Li_2O$, ZnO, BeO, $Cu_2O$, $Fe_2O_3$, $SiO_2$, $UO_2$, $Bi_2O_3$, CoO, $Mn_3O_4$, $TiO_2$, MgO, $ZrO_2$, BaO, $ThO_2$, $Ta_2O_5$, $Al_2O_3$, $Nb_2O_5$, CaO, NiO, SrO, $Cr_2O_3$, $V_2O_5$, $B_2O_3$, $HfO_2$, $Y_2O_3$, $Mn_3O_4$, $BaTiO_3$, $MgAl_2O_4$, $Y_3Al_5O_{12}$, $Fe_3O_4$ and mixtures thereof.

13. A process according to claim 12, wherein said first sinterable material is chosen from $K_2O$, $Na_2O$, $Li_2O$, ZnO, BeO, $Cu_2O$, $Fe_2O_3$, $SiO_2$, $UO_2$, $Bi_2O_3$, CoO, $Mn_3O_4$, $TiO_2$, MgO, $ZrO_2$, BaO, $ThO_2$, $Ta_2O_5$, $Al_2O_3$, $Nb_2O_5$, CaO, NiO, SrO, $Cr_2O_3$, $V_2O_5$, $B_2O_3$, $HfO_2$, $Y_2O_3$ and mixtures thereof, and said contaminant is chlorine.

14. A process according to claim 12, wherein said first sinterable material is chosen from $K_2O$, $Na_2O$, $B_2O_3$, $Al_2O_3$, $Li_2O$, BeO, $Cu_2O$, $Fe_2O_3$, $SiO_2$, $UO_2$, $Bi_2O_3$, CoO, NiO, $TiO_2$, MgO, $ZrO_2$, BaO, $ThO_2$, $Ta_2O_5$, $Nb_2O_5$, CaO, SrO, $Cr_2O_3$, $V_2O_5$, $Y_2O_3$ and mixtures thereof, and said contaminant is fluorine.

15. A process according to any of claims 1-6, wherein said second material is an alkali metal or an alkali metal salt.

16. A process according to claim 15, wherein said second material is a lithium material.

17. A process according to claim 15, wherein said first sinterable material is an oxide and said lithium material is chosen from the group consisting of lithium metal, lithium salts and lithium-containing compounds in which the non-lithium component will be eliminated from the lithium material at a temperature below 1000° C.

18. A process according to claim 17, wherein said lithium material is chosen from the group consisting of lithium oxide, lithium peroxide, lithium oxalate, lithium carbonate, lithium carbide, lithium nitride, lithium tert-butoxide, lithium tartrate, lithium stearate, and combinations thereof.

19. A process according to claim 15, wherein said first material is a non-oxide and said lithium material is provided in the form of lithium metal.

20. A process according to claim 19, wherein:
(a) said first sinterable material is a boride and said lithium material is provided in the form of lithium boride;
(b) said first sinterable material is a carbide and said lithium material is provided in the form of lithium carbide; or
(c) said first sinterable material is a nitride and said lithium material is provided in the form of lithium nitride.

21. A process according to claim 15, wherein the molar ratio of alkali metal or alkali metal salt to contaminant is from about 1:1 to about 1.2:1.

22. A process according to claim 15, wherein the amount of alkali metal or alkali metal salt relative to said contaminant is from 95% of stoichiometric equivalent to 100% stoichiometric excess.

23. A process according to claim 15, wherein the amount of alkali metal or alkali metal salt relative to said contaminant is from a stoichiometric equivalent to 20% stoichiometric excess.

24. A process according to claim 15, wherein the amount of alkali metal or alkali metal salt relative to said contaminant is from a 20% stoichiometric excess to a 1000% stoichiometric excess.

25. A process according to claim 15, wherein the amount of alkali metal or alkali metal salt relative to said contaminant is from a 20% stoichiometric excess to a 100% stoichiometric excess.

26. A process according to claim 1, wherein said temperature is below the sintering temperature of said sinterable material.

27. A process according to claim 26, wherein said temperature is from 400-1100 degrees Celsius.

28. A process according to claim 27, wherein said temperature is from 650-1100 degrees Celsius.

29. A process according to claim 27, wherein said temperature is from 650-800 degrees Celsius.

30. A process for improving the uniformity of density in a sintered material, the process comprising:
(a) providing a mixture of
(i) a first sinterable material containing a contaminant the presence of which results in non-uniform density in said first sinterable material during sintering of said first sinterable material;
(ii) a second material having a higher affinity for said contaminant than does said first sinterable material, wherein the amount of the second material relative to the contaminant is from 95% of stoichiometric equivalent to 1000% stoichiometric excess;
(b) heating said mixture at a first temperature below the sintering temperature of said first sinterable material and for a first time sufficient to allow said second material to at least partly mitigate the propensity of the presence of said contaminant to result in non-uniform density during said sintering of said first sinterable material.

31. A process according to claim 30, comprising (c) further heating said mixture for a second time and at a second temperature higher than said first temperature sufficient to sinter said first sinterable material.

32. A process according to claim 31, wherein said mixture is not cooled between steps (b) and (c).

33. A process according to claim 31, wherein said mixture is allowed to cool between steps (b) and (c).

* * * * *